(12) United States Patent
Hathcock

(10) Patent No.: US 6,443,182 B1
(45) Date of Patent: Sep. 3, 2002

(54) NON-SLAMMING CHECK VALVE

(75) Inventor: Lance Scott Hathcock, Jackson, TN (US)

(73) Assignee: Ingersoll-Rand Company, Woodcliff Lake, NJ (US)

( * ) Notice: Subject to any disclaimer, the term of this patent is extended or adjusted under 35 U.S.C. 154(b) by 0 days.

(21) Appl. No.: 09/707,771

(22) Filed: Nov. 8, 2000

(51) Int. Cl.$^7$ .............................................. F16K 21/10
(52) U.S. Cl. ................................................. 137/514.5
(58) Field of Search ............................. 137/514.5, 514, 137/514.3, 516.7; 251/330

(56) References Cited

U.S. PATENT DOCUMENTS

| | | | |
|---|---|---|---|
| 502,252 A | * 7/1893 | Hanna | 137/514.5 |
| 558,034 A | * 4/1896 | Brown et al. | 137/514.5 |
| 677,776 A | 7/1901 | Devantery | |
| 688,830 A | * 12/1901 | Collins | 137/514.5 |
| 1,111,319 A | * 9/1914 | Paulsmeiel | 137/514.5 |
| 1,138,338 A | * 5/1915 | Whitney | 137/514.5 |
| 1,710,214 A | * 4/1929 | Hassold | 137/514.5 |
| 1,754,975 A | 4/1930 | Anderson | |
| 2,197,455 A | * 4/1940 | Volpin | 137/514.5 |
| 2,927,604 A | 3/1960 | Johnson | 137/514.5 |
| 2,927,605 A | 3/1960 | Stephens | 137/514.5 |
| 3,044,488 A | 7/1962 | Mennesson | 137/514 |
| 3,085,589 A | 4/1963 | Sands | 137/498 |
| 3,605,802 A | 9/1971 | Hertell | 137/514.5 |
| 4,361,280 A | 11/1982 | Rosenberg | 239/76 |
| 4,915,354 A | 4/1990 | Sims, Jr. | 251/334 |
| 5,240,036 A | 8/1993 | Morris | 137/514.7 |
| 5,685,333 A | 11/1997 | Skaryd | 137/514.3 |
| 6,027,105 A | 2/2000 | Dohrmann et al. | 267/139 |

FOREIGN PATENT DOCUMENTS

EP        0 333 526        9/1989

* cited by examiner

Primary Examiner—Michael Powell Buiz
Assistant Examiner—Meredith H Schoenfeld
(74) Attorney, Agent, or Firm—Michael Best & Friedrich LLP

(57) ABSTRACT

A check valve is provided for stopping the reverse flow of fluid through a fluid-carrying conduit and includes a fluid dampening device to dampen the closing movement of the valve upon flow reversal. The fluid dampening device includes a member for containing a fluid that becomes compressed upon a reverse flow of fluid through a conduit that houses the check valve. As the check valve is forced by a reverse fluid flow in a reverse direction, fluid in the fluid dampening device becomes compressed and is permitted to slowly seep out of the fluid dampening device via fluid passageways that permit only the slow escape of fluid from a compressed fluid chamber.

21 Claims, 4 Drawing Sheets

NON-SLAMMING CHECK VALVE

BACKGROUND

The present invention relates to a check valve for shutting off the reverse flow of fluid through a conduit upon a fluid flow reversal event.

A common problem with existing check valves is that upon flow reversal, as can occur in fluid flow systems, the check valve slams shut. The slamming action of the valve and repeated slamming can damage the valve and prevent the valve from operating properly. A need exists for a check valve that can stop the reverse flow of fluid through a fluid carrying conduit without causing damage to the valve or to the conduit. It would be desirable to provide a check valve that does not slam shut upon reverse flow conditions in a fluid carrying conduit but instead is provided with a dampening feature to allow a smooth and non-damaging closing movement of the valve upon reverse fluid flow.

SUMMARY OF THE INVENTION

The present invention provides a check valve for allowing the flow of fluid through a fluid-carrying conduit in a normal, forward direction, and for preventing the reverse flow of fluid in a reverse direction. The check valve of the present invention is designed such that upon a reversal of fluid flow through a conduit in which the check valve is employed, the closing movement of the valve is dampened and does not slam shut.

This objective is achieved according to the present invention by providing a check valve that includes a sealing device, a guide plate, and a valve plate with a dampening chamber wherein the sealing device includes a sealing plate, a guide shaft, and a dampening shaft that cooperates with the dampening chamber. The sealing plate is adapted to seal one or more through-passages in the valve plate that allow the flow of fluid through the valve plate. The guide shaft extends from a first surface of the sealing plate and is adapted for reciprocating guided movement within a guide aperture of the guide plate. The guide plate is adapted to be positioned within a fluid-carrying conduit and has one or more through-passages for allowing the flow of fluid through the guide plate. Preferably, the guide aperture is centrally located through the guide plate and guides the reciprocating movement of the guide shaft. The dampening shaft extends from a second surface of the sealing plate that is opposite the first surface. The dampening shaft is adapted for reciprocating movement within the dampening chamber of the valve plate.

The valve plate is adapted to be positioned within a fluid-carrying conduit and has one or more through-passages for allowing the flow of fluid through the valve plate. A seat is provided surrounding the through-passages of the valve plate and is designed for contacting the second surface of the sealing device to prevent the flow of fluid through the through-passages of the valve plate. The dampening chamber receives the dampening shaft and is adapted for providing a fluid cushioning of the dampening shaft as the dampening shaft moves into the dampening chamber, as occurs upon a reversal of fluid flow through the fluid-carrying conduit. At least one of the dampening shaft and the dampening chamber includes a choke bore for preferably allowing the slow escape of compressed fluid from the dampening chamber upon movement of the dampening shaft into the dampening chamber. The dampening shaft, dampening chamber, and choke bore are respectively dimensioned such that when the guide plate, sealing device, and valve plate are operably positioned within a fluid-carrying conduit, and the dampening shaft is forced into the dampening chamber, fluid within the dampening chamber becomes compressed and escapes through the choke bore at a rate that is sufficiently slow to dampen the movement of the dampening shaft into the dampening chamber.

It is to be understood that both the foregoing general description and the following detailed description are exemplary and explanatory only and are only intended to provide a further explanation of the present invention, as claimed. The accompanying drawings, which are incorporated in and constitute a part of this application, illustrate several exemplary embodiments of the present invention and together with description serve to explain the principles of the present invention.

BRIEF DESCRIPTION OF THE DRAWINGS

The present invention may be more fully understood with reference to the accompanying figures. The figures are intended to illustrate exemplary embodiments of the present invention without limiting the scope of the invention.

DETAILED DESCRIPTION

Figure 1:
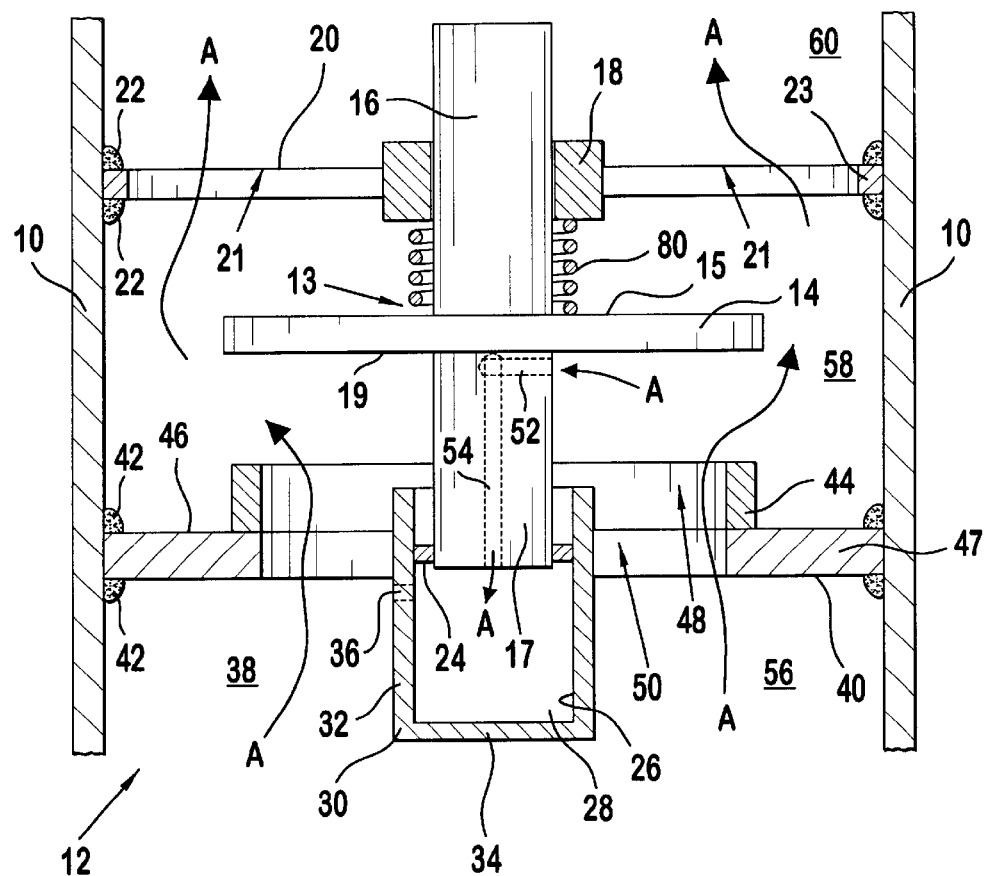
FIG. 1 is a cut-away view of a section of pipe containing therein a check valve, shown in partial cross section and in partial phantom view, according to an embodiment of the present invention.

The check valve of the present invention provides a dampening closing movement of a sealing device upon reverse fluid flow conditions in a fluid-carrying conduit. The dampened movement prevents a slamming action of the sealing device when the check valve is closed. The present invention provides the dampened action by a check valve design that includes a sealing device, a guide plate, and a valve plate, wherein the sealing device includes a sealing plate, a guide shaft, and a dampening shaft. All components are preferably made of durable, non-corrosive materials such as metal or hard plastic or the like. Aluminum and stainless steel are preferred materials for the check valve components.

The sealing device includes a sealing plate that is preferably disk-shaped, though other shapes can be used. The guide shaft and the dampening shaft of the sealing device are preferably cylindrical shafts that preferably extend perpendicularly from opposite first and second surfaces of the sealing plate. Again, other shapes can be used. The sealing plate is adapted to seal one or more through-passages in the valve plate that allow the flow of fluid through the valve plate. The sealing plate, guide shaft, and dampening shaft of the sealing device can be integrally formed or molded, welded, or otherwise connected together after being separately made. The guide shaft and dampening shaft can be continuous with one another, for example, in the form of a continuous shaft or dowel, and the sealing plate can be a ring with a hole in the middle through which one of the guide shaft and dampening shaft is slipped and then connected. The sealing plate can then be mounted to the shaft at about a midpoint to form the sealing device.

The guide shaft preferably extends through a guide aperture of the guide plate. Preferably, the guide aperture of the guide plate is formed in a central location of the guide plate and has a diameter that is slightly larger than the outer diameter of the guide shaft. The guide shaft, or reciprocating shaft, is preferably guided in its reciprocating motion by the guide aperture of the guide plate.

The dampening shaft preferably extends directly opposite the guide shaft, and extends from the second surface of the sealing plate. The dampening shaft is adapted for reciprocating movement within a dampening chamber or fluid cushioning chamber of the valve plate. The valve plate is adapted to be positioned within a fluid-carrying conduit and to have one or more through-passages for allowing a flow of fluid through the valve plate. A seat, provided on a top surface of the valve plate that faces the guide plate, surrounds the one or more through-passages in the valve plate and is designed for contacting the second surface of the sealing device or sealing plate so that, upon contact, the flow of fluid through the through-passages of the valve plate is prevented.

The dampening chamber is preferably positioned in a central location of the valve plate and is preferably aligned with the guide aperture of the guide plate. The dampening chamber, also referred to as a fluid cushioning chamber, preferably comprises a cup-shaped member having a hollow cylindrical sidewall and a bottom wall. The dampening chamber could be mounted or formed in a separate plate or disk separate from said valve plate. The dampening chamber receives the dampening shaft and at least one of the dampening shaft and the dampening chamber is provided with a choke bore for allowing the escape of fluid at a limited rate from the dampening chamber as the dampening shaft moves into the dampening chamber. The dampening shaft, dampening chamber, and choke bore are respectively dimensioned such that, in operation, when the sealing plate and associated guide shaft and dampening shaft move in a closing direction, the dampening shaft is forced into the dampening chamber and fluid within the dampening chamber becomes compressed and escapes the dampening chamber through the choke bore at a rate that is sufficiently slow so as to dampen the movement of the dampening shaft into the dampening chamber.

Figure 5:
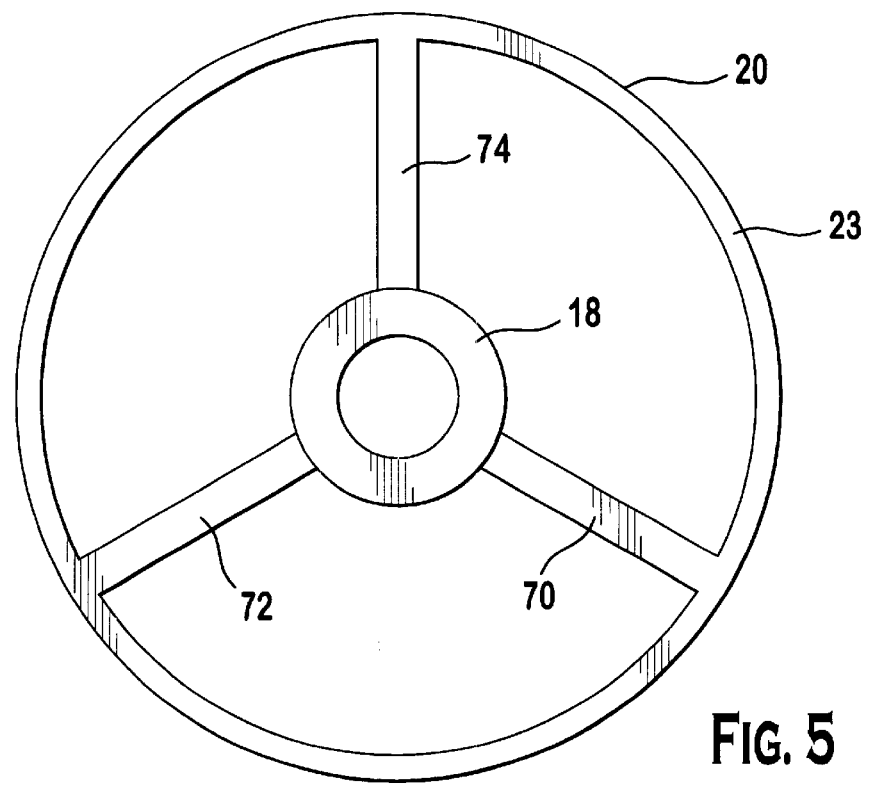
FIG. 5 is a top plan view of the valve guide plate shown in the embodiment of the present invention depicted in FIG. 1.

Referring now to the drawing figures, FIG. 1 shows a section of pipe 10 containing therein a check valve 12 according to an embodiment of the present invention. The check valve 12 includes a sealing device 13, a guide plate 20, and a valve plate 40. In the embodiment shown in FIG. 1, the sealing device 13 is not shown in cross-section. The sealing device includes a sealing means such as a sealing plate 14 fastened, secured, mounted, integrally formed with, fixed, or otherwise secured to a guide shaft or reciprocating shaft 16, and a dampening shaft 17. The reciprocating motion of guide shaft 16 is guided by a guide means such as a shaft guide ring 18 preferably integrally formed at an inner, central portion of the guide plate 20. A TEFLON® ring or other type of bushing can be provided between guide shaft 16 and guide shaft ring 18. Guide plate 20 is mounted within pipe section 10 by spot weld beads 22 and is configured such that the outer diameter of guide plate 20 is the same as the inner diameter of the pipe section 10. The outer diameter of guide plate 20 is defined by another ring 23 as is best seen in FIG. 5. Shaft guide ring 18 has an inner diameter that is substantially the same as, although preferably slightly larger than, the outer diameter of guide shaft 16 to enable a guided reciprocating motion of guide shaft 16 substantially free of frictional interference between the shaft guide ring 18 and the guide shaft 16.

Preferably, the guide plate 20 and valve plate 40 have shapes that match the inner shape of the conduit 10 in which they are mounted, for example, circular in the embodiment shown. Preferably, the sealing plate, guide plate, and valve plate are each symmetrically shaped, for example, each are circular or disk-shaped.

The guide plate 20 and valve plate 40 can alternatively be integrally formed, for example, cast, with sections of pipe that can later be assembled and connected with the sealing device 13 placed between the plates.

Figure 4:
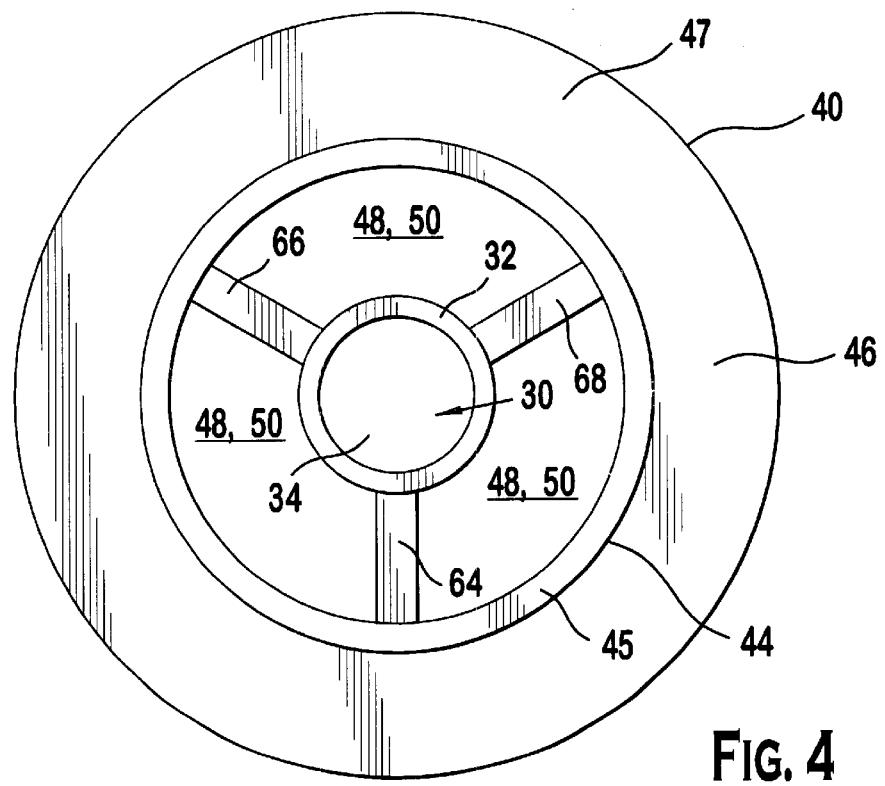
FIG. 4 is a top plan view of the valve seat disk shown in the embodiment of the present invention depicted in FIG. 1.

The guide shaft 16 extends from a top surface 15 of sealing plate 14. The dampening shaft 17 extends from a bottom surface 19 of sealing plate 14, preferably directly opposite the guide shaft 16. The reciprocating motion of dampening shaft 17 is guided by the motion of a sealing ring 24 mounted, secured, or otherwise fixed to dampening shaft 17 at a lower end of dampening shaft 17. The sealing ring 24 is preferably made of a material exhibiting lubricity, such as a TEFLON® material, and may be made of a conventional bushing material. The reciprocating motion of dampening shaft 17 is guided by the motion of sealing ring 24 along an inner wall 26 of a dampening means such as a fluid cushioning or dampening chamber 28. Further, details of guide plate 20 and valve plate 40 are shown in FIGS. 5 and 4, respectively.

The fluid cushioning or dampening chamber 28 is defined by a cup-shaped member 30 having a sidewall 32 and a bottom wall 34. Provided in the sidewall 32 of cup-shaped member 30 is a bleed hole 36 for allowing the passage of air or fluid from said fluid cushioning or dampening chamber 28 to the interior space 38 of the pipe section 10. The cup-shaped member 30 that defines fluid cushioning or dampening chamber 28 is preferably mounted to the central portion of a flow-through valve plate 40 that is secured to the inner wall of pipe section 10, for example, by beads of welding material 42 welded to an outer ring 47. Also mounted, secured, or otherwise fixed to flow-through valve plate 40 is a seat means such as a sealing plate seat 44 that extends from an upper surface 46 of flow-through valve plate 40. Sealing plate seat 44 is ring-shaped and provides a through-passage 48 through the inner portion thereof. The sealing plate seat may be integrally formed, for example, cast, with the valve plate 40 or it may be made separately and then fixed or otherwise connected to the valve plate 40. The seat 44 is preferably made of a non-corrosive material and can be made of a rubber or plastic material, such as TEFLON®, adhered to the valve plate 40. Through-passage 48 communicates with one or more through-passages 50 formed through the flow-through valve plate 40.

Dampening shaft 17 is provided with one or more bore holes 52, shown in phantom in FIG. 1. Preferably, the bore hole 52 is a radial bore hole. Bore hole 52 communicates with an axial bore 54 also shown in phantom in FIG. 1. Axial bore 54 is preferably formed in the lower end of dampening shaft 17 and extends upward through a central portion of dampening shaft 17 to an intersection with bore hole 52. Thus, a passage is formed from the side of dampening shaft 17 into dampening shaft 17 and out through the lower end thereof.

In operation, fluid flows through pipe section 10 in the direction shown by arrows A. A fluid, such as air, flows from section 56 of pipe section 10 through through-passages 50 and 48, respectively, into section 58 of pipe section 10. From pipe section 58, the fluid flows through one or more through-passages 21 formed in guide plate 20 and into pipe section 60. The flow of fluid through pipe section 10 typically also includes a flow of fluid into bore hole 52, through axial bore 54, into fluid cushioning or dampening chamber 28, and out bleed hole 36. The flow of fluid through pipe section 10 urges the sealing plate 14 and its connected guide shaft 16 in an upward open direction in the view shown in FIG. 1, against the force of a biasing element 80 in the form of a helical spring that urges the sealing plate in a closed direction. The upward movement of the sealing plate 14 and guide shaft 16 can be limited by an advancement restraining device such as a spring, mechanical stop, or other device that limits the movement of the sealing plate 14 in the direction of the flow of fluid.

Figure 2:
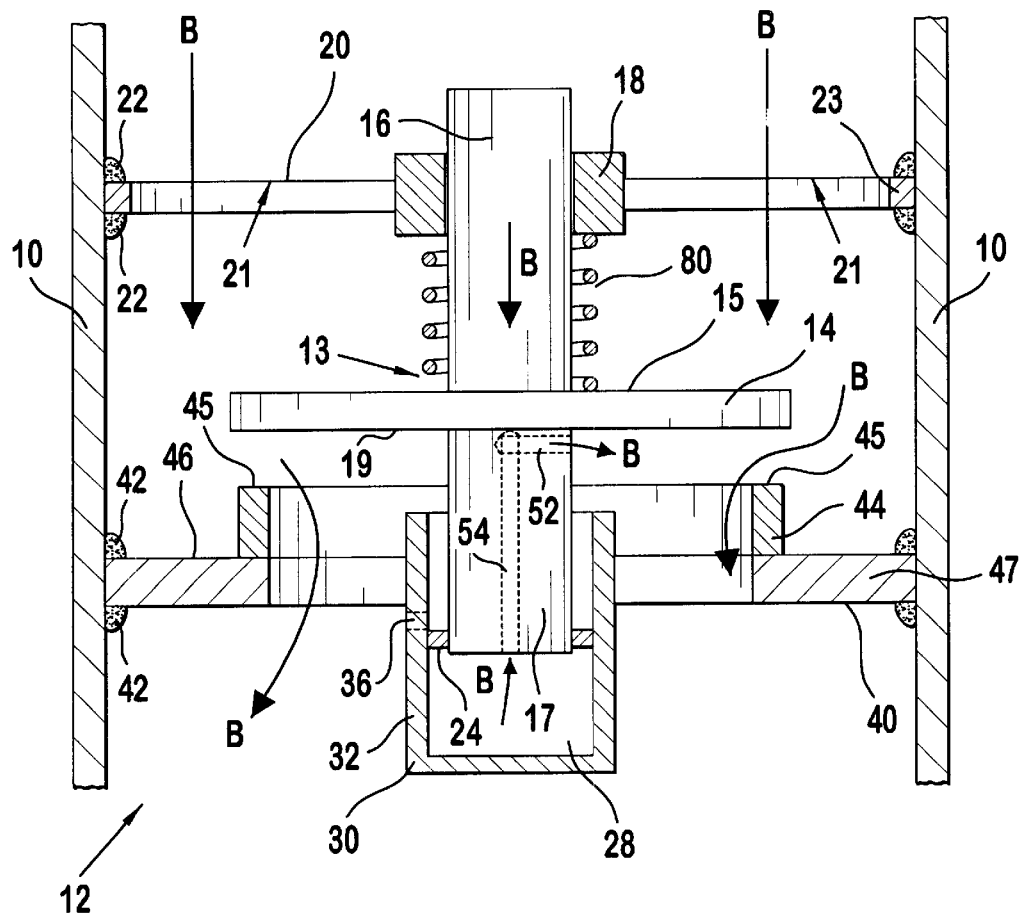
FIG. 2 is a cut-away view of the section of pipe shown in FIG. 1 wherein the check valve of the present invention is in a partially closed position.

Referring now to FIG. 2, wherein reference numerals that are the same as used in FIG. 1 represent the same respective components. Upon a reversal of the direction of fluid flow through pipe section 10, as shown by flow directional arrows B, sealing device 13 begins to close and is shown in a partially closed position. As can be seen in FIG. 2, the sealing ring 24 disposed at the lower end of dampening shaft 17 has moved passed bleed hole 36 in the sidewall 32 of cup-shaped member 30 that defines the dampening chamber 28. As a result, fluid trapped within the bottom portion of fluid cushioning chamber 28 cannot escape through bleed hole 36 because sealing ring 24 forms a seal between the outside of shaft 16 and the inner surface of sidewall 32. As a result of the sealing function of sealing ring 24, the only escape route for fluid trapped within dampening chamber 28 is through axial bore 54 and out bore hole 52. As a result, the rate of escape of fluid from dampening chamber 28 slows after the sealing ring 24 moves into dampening chamber 28 past bleed hole 36, relative to the rate of escape upon the initial closing movement. Preferably, the diameter of at least one of axial bore 54 and bore hole 52 is smaller than the diameter of bleed hole 36. Preferably, at least one of axial bore 54 and bore hole 52 is sufficiently small such that fluid in dampening chamber 28 becomes compressed due to the downward motion of dampening shaft 17 and sealing ring 24. Preferably, the compression of fluid in dampening chamber 28 is significant enough and/or the rate of escape of fluid from dampening chamber 28 is slow enough, to cushion, dampen, or slow the advancement of dampening shaft 17 and the connected sealing plate 14 in the downward direction, thereby preventing a slamming action of sealing plate 14 against the top surface 45 of sealing plate seat 44.

Figure 3:
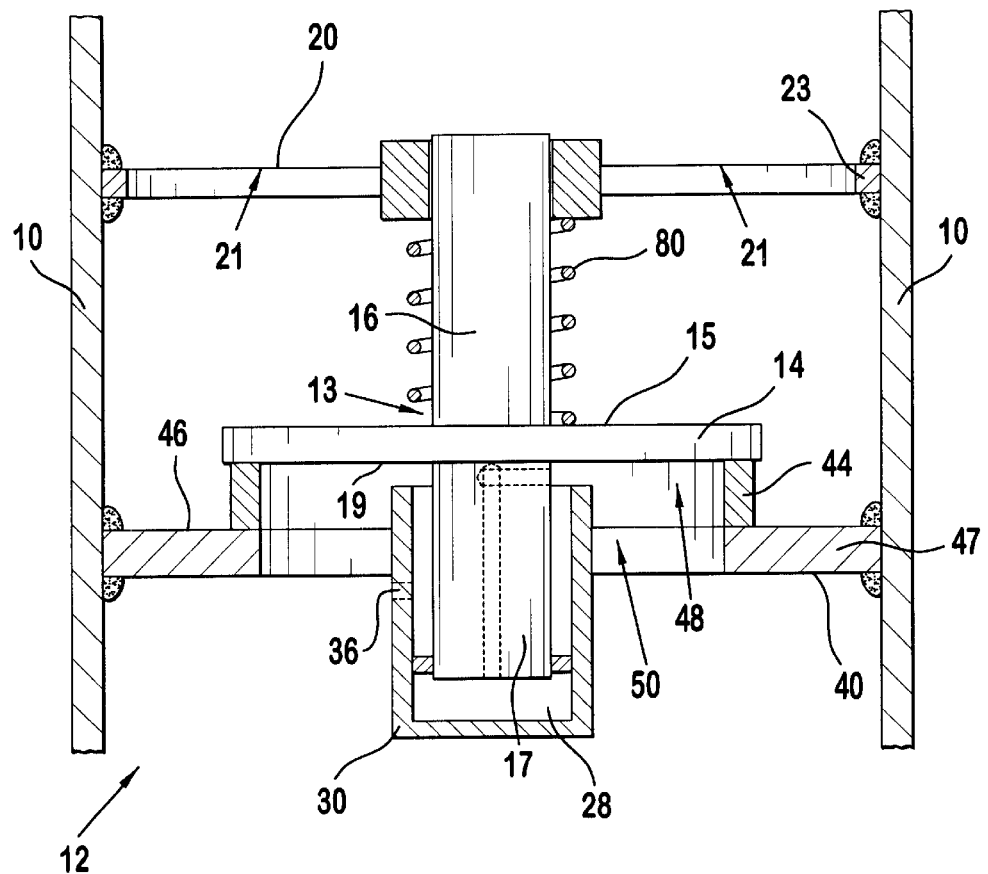
FIG. 3 is a cut-away view of the section of pipe shown in FIG. 1 wherein the check valve of the present invention is in a fully closed position.

Referring now to FIG. 3, wherein reference numerals identical to those used in FIGS. 1 and 2 depict identical perspective components to those shown in FIGS. 1 and 2, the reverse motion of sealing device 13 has been completed and the sealing plate 14 is seated against the top surface 45 of seat 44. In the fully closed positioned shown, the flow of fluid through through-passages 48 and 50 has ceased and the reverse flow of fluid through pipe section 10 has ceased. The sealing plate 14, guide shaft 16, and dampening shaft 17 will remain in the closed positions shown in FIG. 3 until a forward flow of fluid, as depicted in FIG. 1, resumes through pipe section 10.

FIG. 4 shows a top plan view of the flow-through valve plate 40, including the sealing plate seat 44 and the cup-shaped member 30 shown in FIGS. 1–3. As can be seen in FIG. 4, the flow-through disk 40 is made of a solid material such as metal, and has through passages 48, 50 through a substantially central portion thereof. The cup-shaped member 30 can be seen in the central portion of the flow-through valve plate 40 including the sidewall 32 and the bottom wall 34. The sealing plate seat 44, as shown, constitutes a ring-shaped protrusion extending from the top surface 46 of the flow-through valve plate 40. The top surface 45 of the sealing plate seat 44 provides a flat sealing surface for contacting the sealing plate 14 (not shown in FIG. 4). The cup-shaped member 30 is secured to the flow-through valve plate 40 by three mounting brackets 64, 66, 68, as shown in FIG. 4. The mounting brackets 64, 66, and 68 can be welded, integrally formed with, or otherwise, fixed, mounted, or secured to flow-through valve plate 40, preferably by a suitable method recognized by those skilled in the art. Mounting brackets 64 and 66 are not shown in the cross sectional view of flow-through valve plate 40 depicted in FIGS. 1–3 and mounting bracket 68 is hidden from view by dampening shaft 17 and cup-shaped member 30.

FIG. 5 is a top plan view of the guide plate 20 shown in FIGS. 1–3. As shown in FIG. 5, the guide plate 20 includes guide member 18 in the form of a ring mounted in a central portion of the guide plate 20. The guide member 18 is connected to an outer ring 23 of guide plate 20 by mounting brackets 70, 72, and 74. Mounting brackets 70, 72, and 74 can be welded, integrally formed with, or otherwise mounted, fixed, or secured to the centrally located guide member 18 and the outer ring 23 in any suitable manner recognized by those skilled in the art. In the cross sectional view of guide plate 20 shown in FIGS. 1–3, mounting brackets 70 and 72 are not shown and mounting bracket 74 is hidden from view by a top portion of guide member 18.

It will be apparent to those skilled in the art that various modifications and variations can be made to the embodiments of the present invention without departing from the spirit or scope of the present invention. Thus, it is intended that the present invention cover other modifications and variations of this invention within the scope of the appended claims and their equivalents.

What is claimed is:

1. A check valve comprising:
   a sealing device comprising a sealing plate, a guide shaft, and a dampening shaft, said guide shaft extending from a first surface of said sealing plate and said dampening shaft extending from a second surface of said sealing plate wherein said second surface is opposite said first surface;
   a guide plate adapted to be positioned within a fluid-carrying conduit, said guide plate having one or more through-passages for allowing a flow of fluid through said guide plate, and a guide aperture for guiding the reciprocating movement of said guide shaft;
   a valve plate adapted to be positioned within a fluid-carrying conduit, said valve plate having one or more through-passages for allowing a flow of fluid through said valve plate, and a seat surrounding said one or more through-passages in said valve plate and for contacting said second surface of said sealing device to prevent the flow of fluid through said one or more through-passages of said valve plate; and
   a dampening chamber for receiving said dampening shaft;
   wherein at least said dampening shaft includes a choke bore for allowing the escape of fluid from said dampening chamber, wherein said dampening shaft, said dampening chamber, and said choke bore are respectively dimensioned such that when said guide plate, said sealing device, said valve plate, and said dampening chamber are operably positioned within a fluid-carrying conduit, and said dampening shaft is forced into said dampening chamber, fluid within said dampening chamber becomes compressed and escapes said dampening chamber through said choke bore at a rate that is sufficiently slow to dampen the movement of said dampening shaft into said dampening chamber.

2. The check valve of claim 1, wherein said guide plate is disk-shaped and said guide aperture is centrally located through said guide plate.

3. The check valve of claim 1, wherein said valve plate is substantially disk-shaped and said dampening chamber is positioned at a central location of said valve plate.

4. The check valve of claim 1, wherein said sealing plate is substantially disk-shaped.

5. The check valve of claim 1, further comprising a sealing element disposed between said dampening shaft and an inner sidewall surface of said dampening chamber.

6. The check valve of claim 5, wherein said sealing element comprises a sealing ring.

7. The check valve of claim 1, wherein said dampening shaft has a distal end spaced from said sealing plate, said choke bore is formed in said dampening shaft and comprises an axial bore formed in the distal end of said dampening shaft and a radial bore formed through a side of said dampening shaft at a location between said sealing plate and said distal end.

8. The check valve of claim 1, mounted within a fluid-carrying conduit, wherein said guide plate and said valve plate are secured to an inner wall surface of said fluid-carrying conduit and said sealing device is positioned such that said sealing plate reciprocates between said guide plate and said valve plate.

9. The check valve of claim 1, wherein said dampening chamber includes a bleed hole formed in a sidewall of said dampening chamber for allowing the escape of fluid from said dampening chamber upon movement of said dampening shaft into said dampening chamber, said sealing element is secured to said dampening shaft, and wherein, in operation, when said dampening shaft moves into said dampening chamber and said sealing agent moves past said bleed hole, fluid compressed in said dampening chamber by the movement of said dampening shaft into said dampening chamber cannot escape said dampening chamber through said bleed hole.

10. The check valve of claim 1, wherein said dampening chamber comprises a cupshaped element having a sidewall and a bottom.

11. The check valve of claim 10, wherein a sealing element is disposed between an outer surface of said dampening shaft and an inner surface of said sidewall.

12. The check valve of claim 11, wherein a bleed hole is provided in said sidewall for allowing the escape of fluid from said dampening chamber upon movement of said dampening shaft into said dampening chamber.

13. The check valve of claim 11, wherein said sealing element comprises a TEFLON® material.

14. The check valve of claim 1, wherein said valve plate includes a top surface that, in operation, faces said guide plate, and wherein said seat extends from said top surface of said valve plate.

15. The check valve of claim 1, wherein said sealing device, said guide plate, and said valve plate comprise metallic materials.

16. The check valve of claim 1, wherein said sealing plate is disk-shaped and said guide shaft and said dampening shaft are substantially cylindrically shaped.

17. The check valve of claim 1, wherein said sealing device, said guide plate, and said valve plate are each symmetrically-shaped.

18. A check valve comprising:
a sealing device comprising a sealing means, a guide shaft, and a dampening shaft, said sealing means adapted to seal one or more through-passages in a valve plate that allow the flow of fluid through the valve plate, said guide shaft extending from a first surface of said sealing means and adapted for reciprocating guided movement within a guide aperture of a guide plate, and said dampening shaft extending from a second surface of said sealing means wherein said second surface is opposite said first surface, said dampening shaft adapted for reciprocating movement within a dampening chamber;

a guide plate adapted to be positioned within a fluid-carrying conduit, said guide plate having one or more through-passages for allowing a flow of fluid through said guide plate, and a guide means for guiding the reciprocating movement of said guide shaft;

a valve plate adapted to be positioned within a fluid-carrying conduit, said valve plate having one or more through-passages for allowing a flow of fluid through said valve plate, and a seat means surrounding said one or more through-passages in said valve plate and for contacting said second surface of said sealing means to prevent the flow of fluid through said or more through-passages of said valve plate; and a dampening means for receiving said dampening shaft, wherein at least one of said dampening shaft and said dampening means includes a choke bore for allowing the escape of fluid from said dampening means, wherein said dampening shaft, said dampening means, and said choke bore are respectively dimensioned such that when said guide plate, said sealing device, said valve plate, and said dampening means are operably positioned within a fluid-carrying conduit, and said dampening shaft is forced into said dampening means, fluid within said dampening means becomes compressed and escapes said dampening means through said choke bore at a rate that is sufficiently slow to dampen the movement of said dampening shaft into said dampening means.

19. The check valve of claim 18, wherein said sealing device, said guide plate, said valve plate, and said dampening means are operably positioned within a section of a fluid-carrying conduit.

20. A method of dampening the closing movement of a sealing plate in a check valve in a fluid-carrying conduit, comprising:
providing a sealing device comprising a sealing plate, a guide shaft, and a dampening shaft, said sealing plate adapted to seal one or more through-passages in a valve plate that allow the flow of fluid through the valve plate, said guide shaft extending from a first surface of said sealing plate and adapted for reciprocating guided movement within a guide aperture of a guide plate, and said dampening shaft extending from a second surface of said sealing plate wherein said second surface is opposite said first surface, said dampening shaft adapted for reciprocating movement within a dampening chamber;

providing a guide plate within said fluid-carrying conduit, said guide plate having one or more through-passages for allowing a flow of fluid through said guide plate, and a guide aperture for guiding the reciprocating motion of said guide shaft;

providing a valve plate positioned within said fluid-carrying conduit, said valve plate having one or more through-passages for allowing a flow of fluid through said valve plate, and a seat surrounding said one or more through-passages in said valve plate and for contacting said second surface of said sealing device to prevent the flow of fluid through said one or more through-passages of said valve plate;

providing a dampening chamber for receiving said dampening shaft, wherein at least one of said dampening shaft and said dampening chamber includes a choke bore for allowing the escape of fluid from said dampening chamber, wherein said dampening shaft, said dampening chamber, and said choke bore are respectively dimensioned such that when said dampening shaft is forced into said dampening chamber, the fluid within said dampening chamber becomes compressed and escapes said dampening chamber through said choke bore at a rate that is sufficiently slow to dampen the movement of said dampening shaft into said dampening chamber; and causing a reverse flow of fluid through said fluid-carrying conduit, said reverse flow of fluid forcing said dampening shaft into said dampening chamber to compress fluid within said dampening chamber and cause said compressed fluid to escape said dampening chamber through said choke bore at a rate that is sufficiently slow to dampen the movement of said dampening shaft into said dampening chamber.

21. The method of claim 20, wherein said choke bore is formed through said dampening shaft.

* * * * *